United States Patent
Eggleton

(10) Patent No.: US 11,203,854 B1
(45) Date of Patent: Dec. 21, 2021

(54) CUBICAL SUPPORT FOR A FOOT VALVE

(71) Applicant: John Eggleton, Tweed (CA)

(72) Inventor: John Eggleton, Tweed (CA)

( * ) Notice: Subject to any disclaimer, the term of this patent is extended or adjusted under 35 U.S.C. 154(b) by 0 days.

(21) Appl. No.: 16/934,098

(22) Filed: Jul. 21, 2020

(51) Int. Cl.
  *E03B 3/04* (2006.01)
  *B01D 35/02* (2006.01)
  *E02B 9/04* (2006.01)
  *F16L 3/00* (2006.01)
  *C02F 103/00* (2006.01)

(52) U.S. Cl.
  CPC .............. *E03B 3/04* (2013.01); *B01D 35/02* (2013.01); *E02B 9/04* (2013.01); *F16L 3/003* (2013.01); *C02F 2103/007* (2013.01)

(58) Field of Classification Search
  CPC ... E03B 3/04; E02B 9/04; B01D 35/02; F16L 3/00; F16L 3/003
  USPC ............. 210/162, 170.09, 170.1, 232, 747.5; 405/127; 248/49, 75, 80
  See application file for complete search history.

(56) References Cited

U.S. PATENT DOCUMENTS

| | | | |
|---|---|---|---|
| 1,274,121 A * | 7/1918 | White ..................... | B01D 29/17 210/162 |
| 1,451,394 A * | 4/1923 | Hurst ..................... | E02B 1/006 210/162 |
| D218,970 S | 10/1970 | Mango | |
| 4,133,850 A | 1/1979 | Hauser | |
| 4,152,264 A * | 5/1979 | Hanna, Sr. .......... | B01D 21/0012 210/170.09 |
| 5,113,889 A * | 5/1992 | McGuire, Jr. ............. | E03B 3/04 405/127 |
| 5,392,806 A | 2/1995 | Gallant | |
| 5,650,073 A * | 7/1997 | Merrett ................... | B01D 29/33 210/170.09 |
| 5,795,473 A * | 8/1998 | Marks .................. | B01D 29/114 210/232 |
| 5,797,421 A | 8/1998 | Merrett | |
| 6,533,496 B1 | 3/2003 | Elliott | |
| 6,780,311 B1 * | 8/2004 | Haley ....................... | E03B 3/04 210/170.1 |
| 6,949,198 B2 | 9/2005 | Reber | |
| D672,932 S | 12/2012 | Fredendall | |
| 2001/0028021 A1 * | 10/2001 | Martin ................... | B65H 57/14 248/75 |
| 2012/0125828 A1 * | 5/2012 | Watson ..................... | E03B 3/04 210/162 |

* cited by examiner

Primary Examiner — Christopher Upton
(74) Attorney, Agent, or Firm — Kyle A. Fletcher, Esq.

(57) ABSTRACT

The cubical support for a foot valve is configured for use with a foot valve. The cubical support for a foot valve is an openwork framework structure. The cubical support for a foot valve elevates the foot valve above the bed of a body of water. The framework structure forms a protected space around the foot valve. The openwork structure allows for the free flow of water. The cubical support for a foot valve comprises a plurality of pipes, a plurality of tee connectors, a plurality of 90-degree elbow tees, and an adhesive. The plurality of tee connectors and the plurality of 90-degree elbow tees assemble the plurality of pipes into the framework structure. The adhesive secures each congruent end of each pipe selected from the plurality of pipes to a fitting selected from the group consisting of the plurality of tee connectors, and the plurality of 90-degree elbow tees.

17 Claims, 6 Drawing Sheets

CUBICAL SUPPORT FOR A FOOT VALVE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of fixed construction including water supply, more specifically, a method for collecting water. (E03B3/04)

SUMMARY OF INVENTION

The cubical support for a foot valve is configured for use with a foot valve. The cubical support for a foot valve is configured for use with a body of water. The cubical support for a foot valve is a framework structure. The cubical support for a foot valve is an openwork structure. The cubical support for a foot valve is submerged into the body of water such that the cubical support for a foot valve rests on the bed of the body of water. The cubical support for a foot valve elevates the foot valve above the bed of the body of water. The framework structure forms a protected space around the foot valve. The openwork structure allows for the free flow of water towards the foot valve. The cubical support for a foot valve comprises a plurality of pipes, a plurality of tee connectors, a plurality of 90-degree elbow tees, and an adhesive. The plurality of tee connectors and the plurality of 90-degree elbow tees assemble the plurality of pipes into the framework structure. The adhesive secures each congruent end of each pipe selected from the plurality of pipes to a fitting selected from the group consisting of: a) the port of a tee connector selected from the plurality of tee connectors; and, b) the port of a 90-degree elbow tee selected from the plurality of 90-degree elbow tees. The foot valve, the body of water, the bed, and the adhesive are defined elsewhere in this disclosure.

These together with additional objects, features and advantages of the cubical support for a foot valve will be readily apparent to those of ordinary skill in the art upon reading the following detailed description of the presently preferred, but nonetheless illustrative, embodiments when taken in conjunction with the accompanying drawings.

In this respect, before explaining the current embodiments of the cubical support for a foot valve in detail, it is to be understood that the cubical support for a foot valve is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the cubical support for a foot valve.

It is therefore important that the claims be regarded as including such equivalent construction insofar as they do not depart from the spirit and scope of the cubical support for a foot valve. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
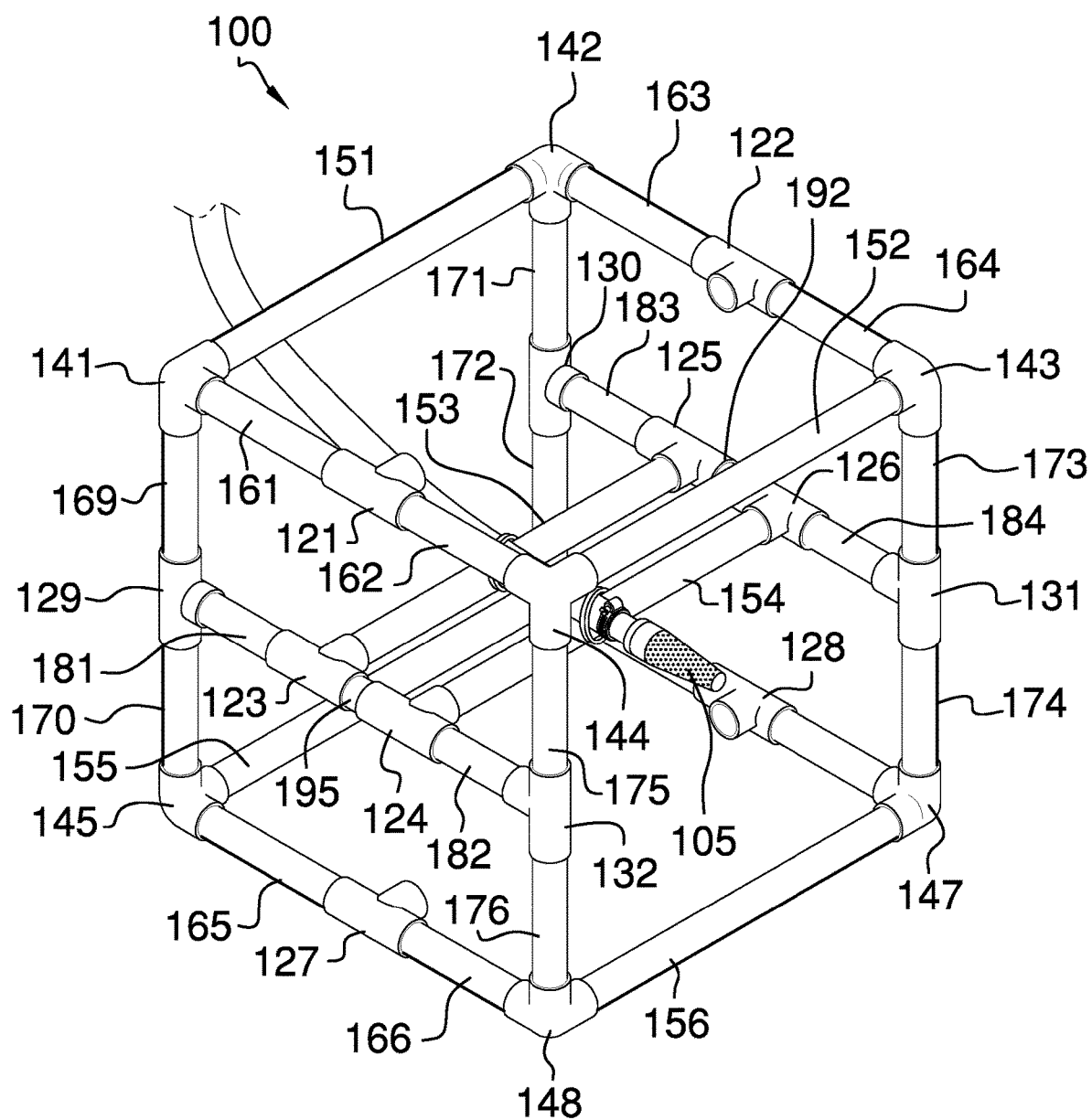
FIG. 1 is a perspective view of an embodiment of the disclosure.
Figure 2:
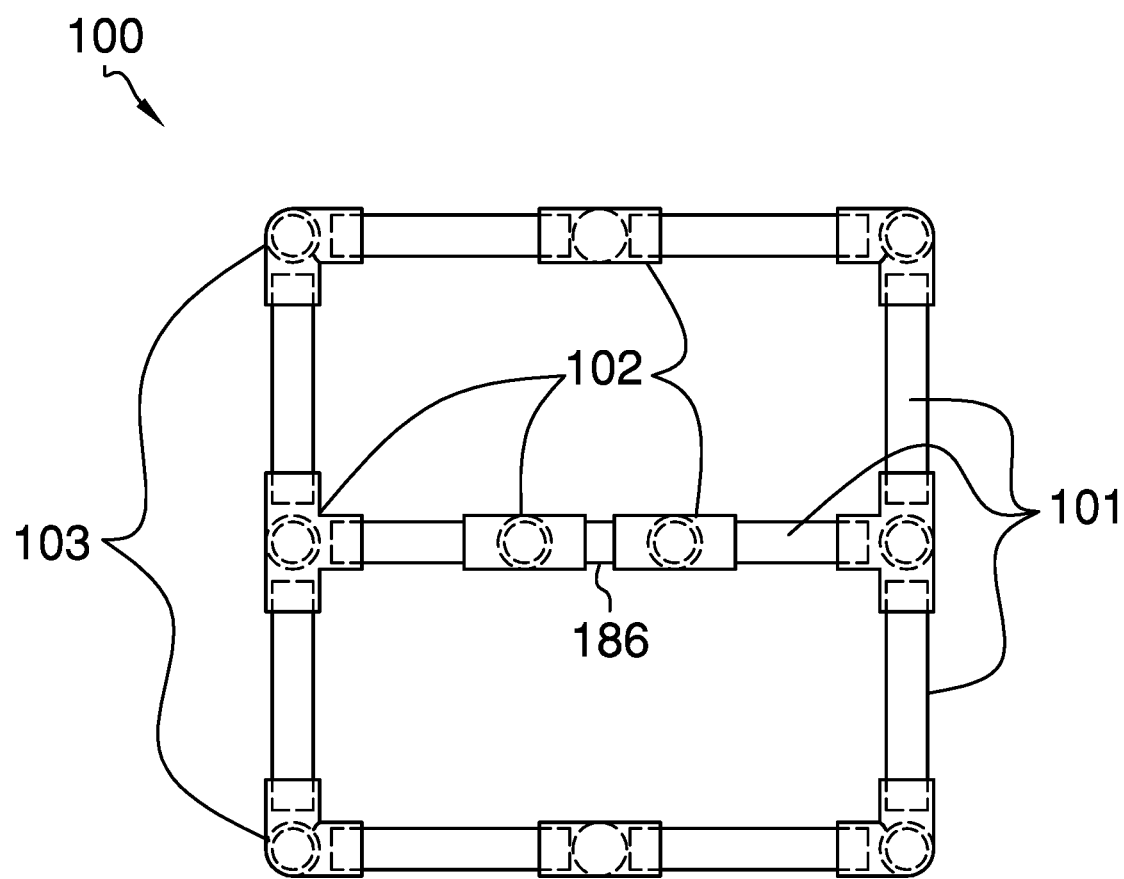
FIG. 2 is a side view of an embodiment of the disclosure.
Figure 3:
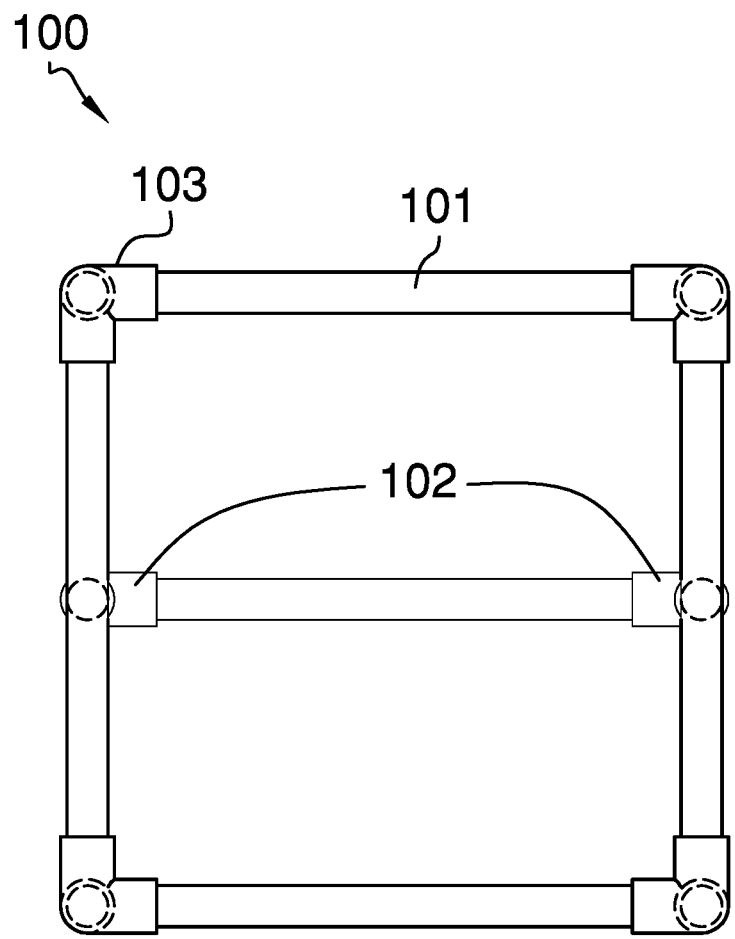
FIG. 3 is a front view of an embodiment of the disclosure.
Figure 4:
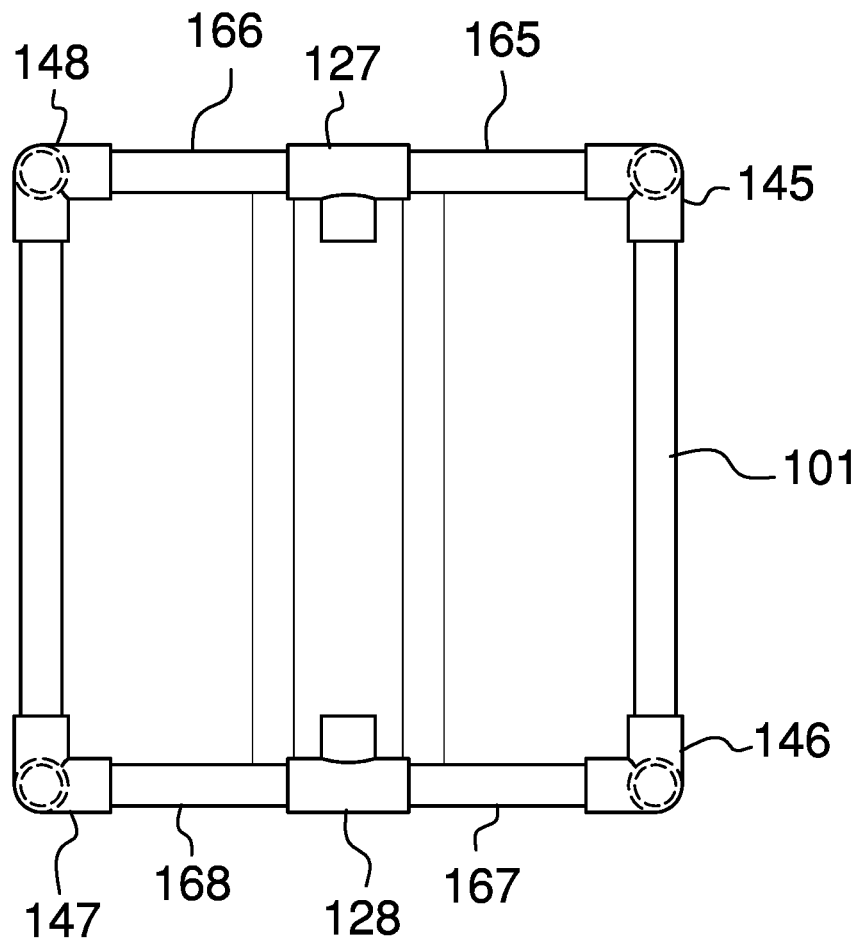
FIG. 4 is a bottom view of an embodiment of the disclosure.
Figure 5:
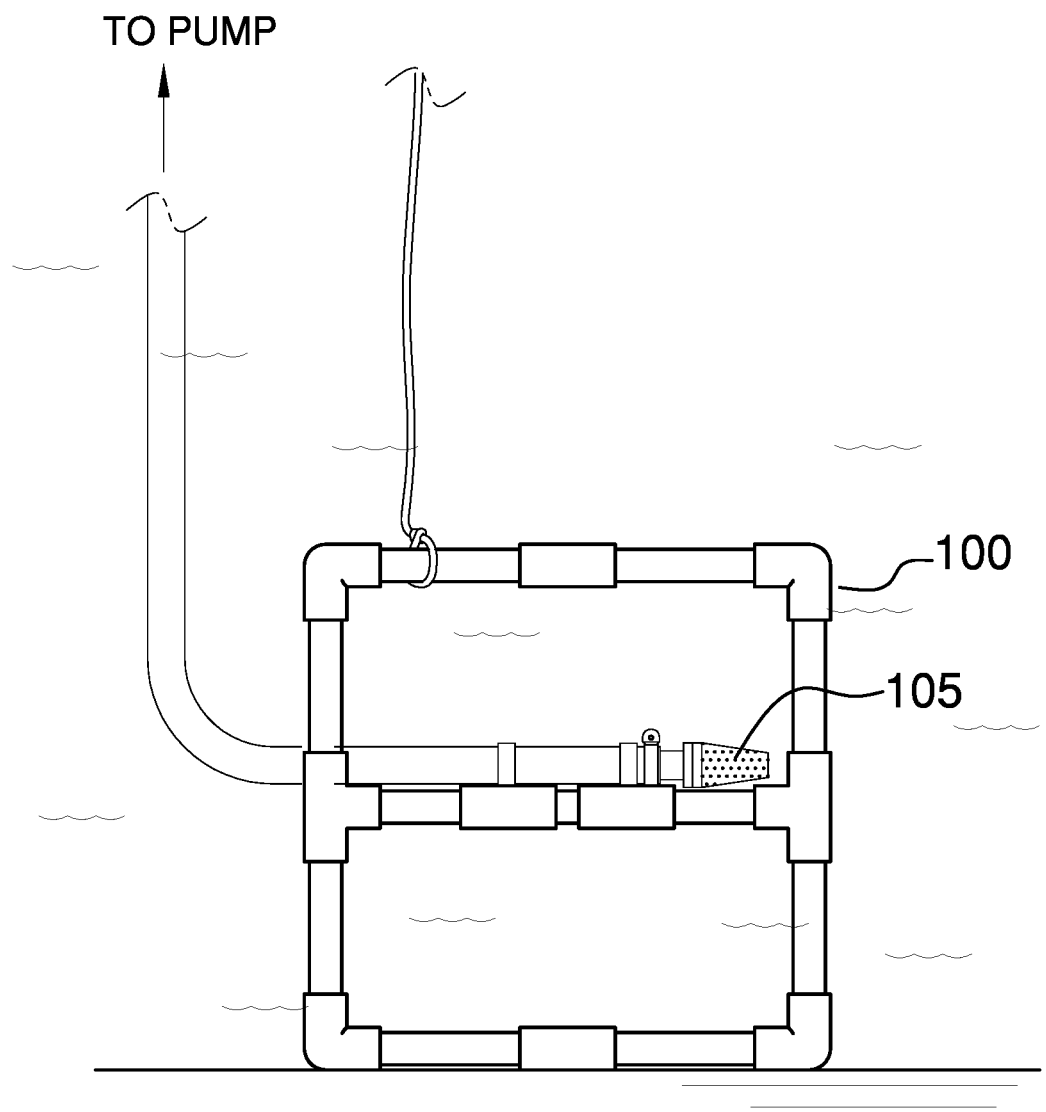
FIG. 5 is an in-use view of an embodiment of the disclosure.
Figure 6:
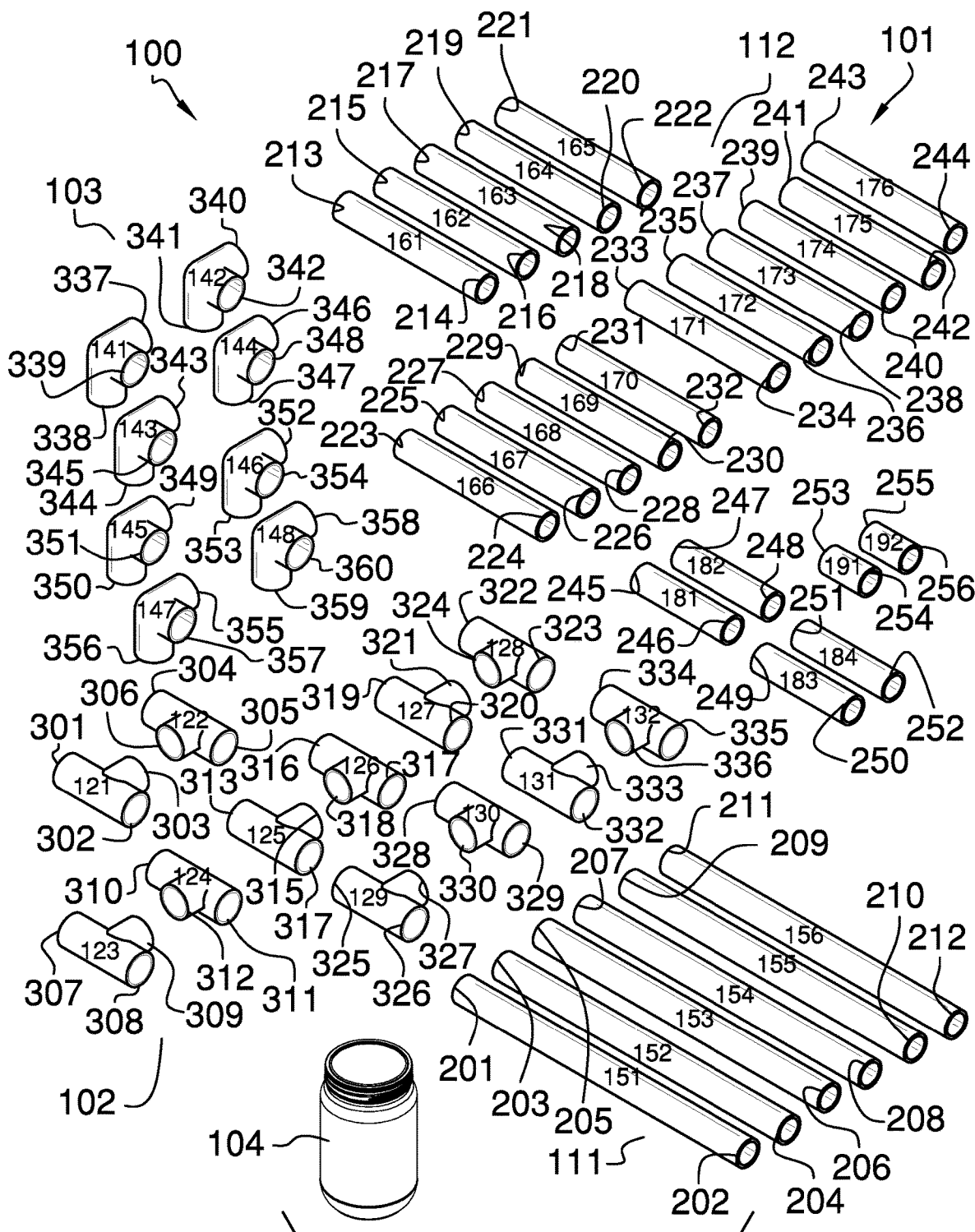
FIG. 6 is a kit view of an embodiment of the disclosure.

Detailed reference will now be made to one or more potential embodiments of the disclosure, which are illustrated in FIGS. 1 through 6.

The cubical support for a foot valve 100 (hereinafter invention) is configured for use with a foot valve 105. The invention 100 is configured for use with a body of water. The invention 100 is a framework structure. The invention 100 is an openwork structure. The invention 100 is submerged into the body of water such that the invention 100 rests on the bed of the body of water. The invention 100 elevates the foot valve 105 above the bed of the body of water. The framework structure forms a protected space around the foot valve 105. The openwork structure allows for the free flow of water towards the foot valve 105. The invention 100 comprises a plurality of pipes 101, a plurality of tee connectors 102, a plurality of 90-degree elbow tees 103, and an adhesive 104. The plurality of tee connectors 102 and the plurality of 90-degree elbow tees 103 assemble the plurality of pipes 101 into the framework structure. The adhesive 104 secures each congruent end of each pipe selected from the plurality of pipes 101 to a fitting selected from the group consisting of: a) the port of a tee connector selected from the plurality of tee connectors 102; and, b) the port of a 90-degree elbow tee selected from the plurality of 90-degree elbow tees 103. The foot valve 105, the body of water, the bed, and the adhesive 104 are defined elsewhere in this disclosure.

The plurality of tee connectors 102 and the plurality of 90-degree elbow tees 103 assemble the plurality of pipes 101 into a rectangular block structure.

The adhesive 104 secures each attachment made between a pipe selected from the plurality of pipes 101 and any structure selected from the group consisting of the plurality of tee connectors 102 and the plurality of 90-degree elbow tees 103. The adhesive 104 is a chemical substance that permanently secures each pipe selected from the plurality of pipes 101 to two structures selected from the group consisting of the plurality of tee connectors 102 and the plurality of 90-degree elbow tees 103. The adhesive 104 is defined elsewhere in this disclosure. Each of the plurality of pipes 101 is a prism-shaped structure. The pipe is defined elsewhere in this disclosure. Each of the plurality of pipes 101 is a rigid structure. Each of the plurality of pipes 101 is further defined with an outer diameter. The geometric shape of each of the plurality of pipes 101 are geometrically identical. The span of the length of the center axis of the prism structure of plurality of pipes 101 equals a length selected from a group consisting of a first length, a second length, a third length, and a fourth length. The span of the first length is greater than the span of the second length. The span of the second length is greater than the span of the third length. The span of the third length is greater than the span of the fourth length. The plurality of pipes 101 are assembled to form the perimeter of the protected space formed by the invention 100.

The plurality of pipes 101 comprises a plurality of full length pipes 111, a plurality of intermediate length pipes 112, a plurality of short length pipes 113, and a plurality of connecting pipes 114.

Each of the plurality of full length pipes 111 is a pipe. Each of the plurality of full length pipes 111 is a rigid prism structure. The plurality of full length pipes 111 are geometrically identical. The span of the length of each of the plurality of full length pipes 111 equals the first length. The plurality of full length pipes 111 comprises a first full length pipe 151, a second full length pipe 152, a third full length pipe 153, a fourth full length pipe 154, a fifth full length pipe 155, and a sixth full length pipe 156. The third full length pipe 153 and the fourth full length pipe 154 form the structure that raises the foot valve 105 above the bed of the body of water.

Each of the plurality of intermediate length pipes 112 is a pipe. Each of the plurality of intermediate length pipes 112 is a rigid prism structure. The plurality of intermediate length pipes 112 are geometrically identical. The congruent ends of each of the plurality of intermediate length pipes 112 are geometrically identical to the congruent ends of any of the plurality of full length pipes 111. The span of the length of each of the plurality of intermediate length pipes 112 equals the second length.

The plurality of intermediate length pipes 112 comprises a first intermediate length pipe 161, a second intermediate length pipe 162, a third intermediate length pipe 163, a fourth intermediate length pipe 164, a fifth intermediate length pipe 165, a sixth intermediate length pipe 166, a seventh intermediate length pipe 167, an eighth intermediate length pipe 168, a ninth intermediate length pipe 169, a tenth intermediate length pipe 170, an eleventh intermediate length pipe 171, a twelfth intermediate length pipe 172, a thirteenth intermediate length pipe 173, a fourteenth intermediate length pipe 174, a fifteenth intermediate length pipe 175, and a sixteenth intermediate length pipe 176.

Each of the plurality of short length pipes 113 is a pipe. Each of the plurality of short length pipes 113 is a rigid prism structure. The plurality of short length pipes 113 are geometrically identical. The congruent ends of each of the plurality of short length pipes 113 are geometrically identical to the congruent ends of any of the plurality of intermediate length pipes 112. The span of the length of each of the plurality of short length pipes 113 equals the third length. The plurality of short length pipes 113 comprises a first short length pipe 181, a second short length pipe 182, a third short length pipe 183, and a fourth short length pipe 184.

Each of the plurality of connecting pipes 114 is a pipe. Each of the plurality of connecting pipes 114 is a rigid prism structure. The plurality of connecting pipes 114 are geometrically identical. The congruent ends of each of the plurality of connecting pipes 114 are geometrically identical to the congruent ends of any of the plurality of short length pipes 113. The span of the length of each of the plurality of connecting pipes 114 equals the fourth length. The plurality of connecting pipes 114 comprises a first connecting pipe 191 and a second connecting pipe 192.

Each of the plurality of tee connectors 102 is a tee connector. The tee connector is defined elsewhere in this disclosure. Each of the plurality of tee connectors 102 are identical. Each tee connector selected from the plurality of tee connectors 102 comprises three ports. The three ports of the selected tee connector are geometrically identical. The three ports of each of the plurality of tee connectors 102 are geometrically similar to any pipe selected from the plurality of pipes 101.

The span of the length of the inner diameter of any port of any tee connector selected from the plurality of tee connectors 102 is greater than the span of the length of the outer diameter of any pipe selected from the plurality of pipes 101 such that the selected pipe inserts into any port of the selected tee connector. The lateral face of any pipe selected from the plurality of pipes 101 is coated with the adhesive 104 before the congruent end of the selected pipe inserts into a port of the tee connector selected to receive the selected pipe. The adhesive 104 secures the selected pipe to the selected port of the selected tee connector.

The plurality of tee connectors 102 comprises a first tee connector 121, a second tee connector 122, a third tee connector 123, a fourth tee connector 124, a fifth tee connector 125, a sixth tee connector 126, a seventh tee connector 127, an eighth tee connector 128, a ninth tee connector 129, a tenth tee connector 130, an eleventh tee connector 131, and a twelfth tee connector 132.

The first tee connector 121 interconnects the first intermediate length pipe 161 and the second intermediate length pipe 162. The second tee connector 122 interconnects the third intermediate length pipe 163 and the fourth intermediate length pipe 164. The third tee connector 123 interconnects the third full length pipe 153, the first short length pipe 181, and the first connecting pipe 191. The fourth tee connector 124 interconnects the fourth full length pipe 154, the second short length pipe 182, and the first connecting pipe 191. The fifth tee connector 125 interconnects the third full length pipe 153, the third short length pipe 183, and the second connecting pipe 192. The sixth tee connector 126 interconnects the fourth full length pipe 154, the fourth short length pipe 184, and the second connecting pipe 192.

The seventh tee connector 127 interconnects the fifth intermediate length pipe 165 and the sixth intermediate length pipe 166. The eighth tee connector 128 interconnects the seventh intermediate length pipe 167 and the eighth intermediate length pipe 168. The ninth tee connector 129 interconnects the ninth intermediate length pipe 169, the tenth intermediate length pipe 170, and the first short length pipe 181. The tenth tee connector 130 interconnects the eleventh intermediate length pipe 171, the second short length pipe 182, and the third short length pipe 183. The eleventh tee connector 131 interconnects the thirteenth intermediate length pipe 173, the fourteenth intermediate length pipe 174, and the fourth short length pipe 184. The twelfth tee connector 132 interconnects the fifteenth intermediate length pipe 175, the sixteenth intermediate length pipe 176, and the second short length pipe 182.

Each of the plurality of 90-degree elbow tees 103 is a 90-degree elbow tee. The 90-degree elbow tee is defined elsewhere in this disclosure. Each of the plurality of 90-degree elbow tees 103 are identical. Each 90-degree elbow tee selected from the plurality of 90-degree elbow tees 103 comprises three ports. The three ports of the selected 90-degree elbow tee are geometrically identical. The three ports of each of the plurality of 90-degree elbow tees 103 are geometrically similar to any pipe selected from the plurality of pipes 101.

The span of the length of the inner diameter of any port of any 90-degree elbow tee selected from the plurality of 90-degree elbow tees 103 is greater than the span of the length of the outer diameter of any pipe selected from the plurality of pipes 101 such that the selected pipe inserts into any port of the selected 90-degree elbow tee. The lateral face of any pipe selected from the plurality of pipes 101 is coated with the adhesive 104 before the congruent end of the selected pipe inserts into a port of the 90-degree elbow tee selected to receive the selected pipe. The adhesive 104 secures the selected pipe to the selected port of the selected 90-degree elbow tee.

The plurality of 90-degree elbow tees 103 comprises a first 90-degree elbow tee 141, a second 90-degree elbow tee 142, a third 90-degree elbow tee 143, a fourth 90-degree elbow tee 144, a fifth 90-degree elbow tee 145, a sixth 90-degree elbow tee 146, a seventh 90-degree elbow tee 147, and an eighth 90-degree elbow tee 148.

The first 90-degree elbow tee 141 interconnects the first full length pipe 151, the first intermediate length pipe 161, and the ninth intermediate length pipe 169. The second 90-degree elbow tee 142 interconnects the first full length pipe 151, the third intermediate length pipe 163, and the eleventh intermediate length pipe 171. The third 90-degree elbow tee 143 interconnects the second full length pipe 152, the fourth intermediate length pipe 164, and the thirteenth intermediate length pipe 173. The fourth 90-degree elbow tee 144 interconnects the second full length pipe 152, the second intermediate length pipe 162, and the fifteenth intermediate length pipe 175.

The fifth 90-degree elbow tee 145 interconnects the fifth full length pipe 155, the fifth intermediate length pipe 165, and the tenth intermediate length pipe 170. The sixth 90-degree elbow tee 146 interconnects the fifth full length pipe 155, the seventh intermediate length pipe 167, and the twelfth intermediate length pipe 172. The seventh 90-degree elbow tee 147 interconnects the sixth full length pipe 156, the eighth intermediate length pipe 168, and the fourteenth intermediate length pipe 174. The eighth 90-degree elbow tee 148 interconnects the sixth full length pipe 156, the sixth intermediate length pipe 166, and the sixteenth intermediate length pipe 176.

The following 22 paragraphs detail the assembly of the invention 100.

The first full length pipe 151 further comprises a first congruent end 201 and a second congruent end 202. The second full length pipe 152 further comprises a third congruent end 203 and a fourth congruent end 204. The third full length pipe 153 further comprises a fifth congruent end 205 and a sixth congruent end 206. The fourth full length pipe 154 further comprises a seventh congruent end 207 and an eighth congruent end 208. The fifth full length pipe 155 further comprises a ninth congruent end 209 and a tenth congruent end 210. The sixth full length pipe 156 further comprises an eleventh congruent end 211 and a twelfth congruent end 212.

The first intermediate length pipe 161 further comprises a thirteenth congruent end 213 and a fourteenth congruent end 214. The second intermediate length pipe 162 further comprises a fifteenth congruent end 215 and a sixteenth congruent end 216. The third intermediate length pipe 163 further comprises a seventeenth congruent end 217 and an eighteenth congruent end 218. The fourth intermediate length pipe 164 further comprises a nineteenth congruent end 219 and a twentieth congruent end 220. The fifth intermediate length pipe 165 further comprises a twenty-first congruent end 221 and a twenty-second congruent end 222. The sixth intermediate length pipe 166 further comprises a twenty-third congruent end 223 and a twenty-fourth congruent end 224. The seventh intermediate length pipe 167 further comprises a twenty-fifth congruent end 225 and a twenty-sixth congruent end 226. The eighth intermediate length pipe 168 further comprises a twenty-seventh congruent end 227 and a twenty-eighth congruent end 228.

The ninth intermediate length pipe 169 further comprises a twenty-ninth congruent end 229 and a thirtieth congruent end 230. The tenth intermediate length pipe 170 further comprises a thirty-first congruent end 231 and a thirty-second congruent end 232. The eleventh intermediate length pipe 171 further comprises a thirty-third congruent end 233 and a thirty-fourth congruent end 234. The twelfth intermediate length pipe 172 further comprises a thirty-fifth congruent end 235 and a thirty-sixth congruent end 236. The thirteenth intermediate length pipe 173 further comprises a thirty-seventh congruent end 237 and a thirty-eighth congruent end 238. The fourteenth intermediate length pipe 174 further comprises a thirty-ninth congruent end 239 and a fortieth congruent end 240. The fifteenth intermediate length pipe 175 further comprises a forty-first congruent end 241 and a forty-second congruent end 242. The sixteenth intermediate length pipe 176 further comprises a forty-third congruent end 243 and a forty-fourth congruent end 244.

The first short length pipe 181 further comprises a forty-fifth congruent end 245 and a forty-sixth congruent end 246. The second short length pipe 182 further comprises a forty-seventh congruent end 247 and a forty-eighth congruent end 248. The third short length pipe 183 further comprises a forty-ninth congruent end 249 and a fiftieth congruent end 250. The fourth short length pipe 184 further comprises a fifty-first congruent end 251 and a fifty-second congruent end 252.

The first connecting pipe 191 further comprises a fifty-third congruent end 253 and a fifty-fourth congruent end 254. The second connecting pipe 192 further comprises a fifty-fifth congruent end 255 and a fifty-sixth congruent end 256.

The first tee connector 121 further comprises a first port 301, a second port 302, and a third port 303. The second tee connector 122 further comprises a fourth port 304, a fifth port 305, and a sixth port 306. The third tee connector 123 further comprises a seventh port 307, an eighth port 308, and a ninth port 309. The fourth tee connector 124 further comprises a tenth port 310, an eleventh port 311, and a twelfth port 312. The fifth tee connector 125 further comprises a thirteenth port 313, a fourteenth port 314, and a fifteenth port 315. The sixth tee connector 126 further comprises a sixteenth port 316, a seventeenth port 317, and an eighteenth port 318.

The seventh tee connector 127 further comprises a nineteenth port 319, a twentieth port 320, and a twenty-first port 321. The eighth tee connector 128 further comprises a twenty-second port 322, a twenty-third port 323, and a twenty-fourth port 324. The ninth tee connector 129 further comprises a twenty-fifth port 325, a twenty-sixth port 326, and a twenty-seventh port 327. The tenth tee connector 130 further comprises a twenty-eighth port 328, a twenty-ninth port 329, and a thirtieth port 330. The eleventh tee connector 131 further comprises a thirty-first port 331, a thirty-second port 332, and a thirty-third port 333. The twelfth tee connector 132 further comprises a thirty-fourth port 334, a thirty-fifth port 335, and a thirty-sixth port 336.

The first 90-degree elbow tee 141 further comprises a thirty-seventh port 337, a thirty-eighth port 338, and a thirty-ninth port 339. The second 90-degree elbow tee 142 further comprises a fortieth port 340, a forty-first port 341, and a forty-second port 342. The third 90-degree elbow tee 143 further comprises a forty-third port 343, a forty-fourth port 344, and a forty-fifth port 345. The fourth 90-degree elbow tee 144 further comprises a forty-sixth port 346, a forty-seventh port 347, and a forty-eighth port 348. The fifth 90-degree elbow tee 145 further comprises a forty-ninth port 349, a fiftieth port 350, and a fifty-first port 351. The sixth 90-degree elbow tee 146 further comprises a fifty-second port 352, a fifty-third port 353, and a fifty-fourth port 354. The seventh 90-degree elbow tee 147 further comprises a fifty-fifth port 355, a fifty-sixth port 356, and a fifty-seventh port 357. The eighth 90-degree elbow tee 148 further comprises a fifty-eighth port 358, a fifty-ninth port 359, and a sixtieth port 360.

The first congruent end 201 of the first full length pipe 151 inserts into the thirty-seventh port 337 of the first 90-degree elbow tee 141. The second congruent end 202 of the first full length pipe 151 inserts into the fortieth port 340 of the second 90-degree elbow tee 142. The third congruent end 203 of the second full length pipe 152 inserts into the forty-sixth port 346 of the fourth 90-degree elbow tee 144. The fourth congruent end 204 of the second full length pipe 152 inserts into the forty-third port 343 of the third 90-degree elbow tee 143.

The fifth congruent end 205 of the third full length pipe 153 inserts into the ninth port 309 of the third tee connector 123. The sixth congruent end 206 of the third full length pipe 153 inserts into the fifteenth port 315 of the fifth tee connector 125. The seventh congruent end 207 of the fourth full length pipe 154 inserts into the twelfth port 312 of the fourth tee connector 124. The eighth congruent end 208 of the fourth full length pipe 154 inserts into the eighteenth port 318 of the sixth tee connector 126.

The ninth congruent end 209 of the fifth full length pipe 155 inserts into the forty-ninth port 349 of the fifth 90-degree elbow tee 145. The tenth congruent end 210 of the fifth full length pipe 155 inserts into the fifty-second port 352 of the sixth 90-degree elbow tee 146. The eleventh congruent end 211 of the sixth full length pipe 156 inserts into the fifty-eighth port 358 of the eighth 90-degree elbow tee 148. The twelfth congruent end 212 of the sixth full length pipe 156 inserts into the fifty-fifth port 355 of the seventh 90-degree elbow tee 147.

The thirteenth congruent end 213 of the first intermediate length pipe 161 inserts into the thirty-eighth port 338 of the first 90-degree elbow tee 141. The fourteenth congruent end 214 of the first intermediate length pipe 161 inserts into the first port 301 of the first tee connector 121. The fifteenth congruent end 215 of the second intermediate length pipe 162 inserts into the second port 302 of the first tee connector 121. The sixteenth congruent end 216 of the second intermediate length pipe 162 inserts into the forty-seventh port 347 of the fourth 90-degree elbow tee 144.

The seventeenth congruent end 217 of the third intermediate length pipe 163 inserts into the forty-first port 341 of the second 90-degree elbow tee 142. The eighteenth congruent end 218 of the third intermediate length pipe 163 inserts into the fourth port 304 of the second tee connector 122. The nineteenth congruent end 219 of the fourth intermediate length pipe 164 inserts into the fifth port 305 of the second tee connector 122. The twentieth congruent end 220 of the fourth intermediate length pipe 164 inserts into the forty-fourth port 344 of the third 90-degree elbow tee 143.

The twenty-first congruent end 221 of the fifth intermediate length pipe 165 inserts into the fiftieth port 350 of the fifth 90-degree elbow tee 145. The twenty-second congruent end 222 of the fifth intermediate length pipe 165 inserts into the nineteenth port 319 of the seventh tee connector 127. The twenty-third congruent end 223 of the sixth intermediate length pipe 166 inserts into the twentieth port 320 of the seventh tee connector 127. The twenty-fourth congruent end 224 of the sixth intermediate length pipe 166 inserts into the fifty-ninth port 359 of the eighth 90-degree elbow tee 148.

The twenty-fifth congruent end 225 of the seventh intermediate length pipe 167 inserts into the fifty-third port 353 of the sixth 90-degree elbow tee 146. The twenty-sixth congruent end 226 of the seventh intermediate length pipe 167 inserts into the twenty-second port 322 of the eighth tee connector 128. The twenty-seventh congruent end 227 of the eighth intermediate length pipe 168 inserts into the twenty-third port 323 of the eighth tee connector 128. The twenty-eighth congruent end 228 of the eighth intermediate length pipe 168 inserts into the fifty-sixth port 356 of the seventh 90-degree elbow tee 147.

The twenty-ninth congruent end 229 of the ninth intermediate length pipe 169 inserts into the third port 303 of the first 90-degree elbow tee 141. The thirtieth congruent end 230 of the ninth intermediate length pipe 169 inserts into the twenty-fifth port 325 of the ninth tee connector 129. The thirty-first congruent end 231 of the tenth intermediate length pipe 170 inserts into the twenty-sixth port 326 of the ninth tee connector 129. The thirty-second congruent end 232 of the tenth intermediate length pipe 170 inserts into the fifty-first port 351 of the fifth 90-degree elbow tee 145.

The thirty-third congruent end 233 of the eleventh intermediate length pipe 171 inserts into the forty-second port 342 of the second 90-degree elbow tee 142. The thirty-fourth congruent end 234 of the eleventh intermediate length pipe 171 inserts into the twenty-eighth port 328 of the tenth tee connector 130. The thirty-fifth congruent end 235 of the twelfth intermediate length pipe 172 inserts into the twenty-ninth port 329 of the tenth tee connector 130. The thirty-sixth congruent end 236 of the twelfth intermediate length pipe 172 inserts into the fifty-fourth port 354 of the sixth 90-degree elbow tee 146.

The thirty-seventh congruent end 237 of the thirteenth intermediate length pipe 173 inserts into the forty-fifth port 345 of the third 90-degree elbow tee 143. The thirty-eighth congruent end 238 of the thirteenth intermediate length pipe 173 inserts into the thirty-first port 331 of the eleventh tee connector 131. The thirty-ninth congruent end 239 of the fourteenth intermediate length pipe 174 inserts into the thirty-second port 332 of the eleventh tee connector 131. The fortieth congruent end 240 of the fourteenth intermediate length pipe 174 inserts into the forty-seventh port 347 of the seventh 90-degree elbow tee 147.

The forty-first congruent end 241 of the fifteenth intermediate length pipe 175 inserts into the forty-eighth port 348 of the fourth 90-degree elbow tee 144. The forty-second congruent end 242 of the fifteenth intermediate length pipe 175 inserts into the thirty-fourth port 334 of the twelfth tee connector 132. The forty-third congruent end 243 of the sixteenth intermediate length pipe 176 inserts into the thirty-fifth port 335 of the twelfth tee connector 132. The forty-fourth congruent end 244 of the sixteenth intermediate length pipe 176 inserts into the sixtieth port 360 of the eighth 90-degree elbow tee 148.

The forty-fifth congruent end 245 of the first short length pipe 181 inserts into the twenty-seventh port 327 of the ninth tee connector 129. The forty-sixth congruent end 246 of the first short length pipe 181 inserts into the seventh port 307 of the third tee connector 123. The forty-seventh congruent end 247 of the second short length pipe 182 inserts into the tenth port 310 of the fourth tee connector 124. The forty-eighth congruent end 248 of the second short length pipe 182 inserts into the thirty-sixth port 336 of the twelfth tee connector 132.

The forty-ninth congruent end 249 of the third short length pipe 183 inserts into the thirtieth port 330 of the tenth tee connector 130. The fiftieth congruent end 250 of the third short length pipe 183 inserts into the thirteenth port 313 of the fifth tee connector 125. The fifty-first congruent end 251 of the fourth short length pipe 184 inserts into the sixteenth port 316 of the sixth tee connector 126. The fifty-second congruent end 252 of the fourth short length pipe 184 inserts into the thirty-third port 333 of the eleventh tee connector 131.

The fifty-third congruent end 253 of the first connecting pipe 191 inserts into the eighth port 308 of the third tee connector 123. The fifty-fourth congruent end 254 of the first connecting pipe 191 inserts into the eleventh port 311 of the fourth tee connector 124. The fifty-fifth congruent end 255 of the second connecting pipe 192 inserts into the fifteenth port 315 of the fifth tee connector 125. The fifty-sixth congruent end 256 of the second connecting pipe 192 inserts into the seventeenth port 317 of the sixth tee connector 126.

The following definitions were used in this disclosure:

90 Degree Elbow Tee: As used in this disclosure, a 90 degree elbow is a three aperture fitting that attaches a first pipe, a second pipe, and a third pipe such that: 1) the center axis of the first pipe is perpendicular to the center axis of the second pipe; 2) the center axis of the second pipe is perpendicular to the center axis of the third pipe; and, 3) the center axis of the third pipe is perpendicular to the center axis of the first pipe.

Adhesive: As used in this disclosure, an adhesive is a chemical substance that can be used to adhere two or more objects to each other. Types of adhesives include, but are not limited to, epoxies, polyurethanes, polyimides, or cyanoacrylates, silicone, or latex based adhesives.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Bed: As used in this disclosure, a bed refers to the ground that forms the bottom of a body of water. Ground that is temporarily submerged underwater is referred to as a flood bed.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Fitting: As used in this disclosure, a fitting is a component that attaches a first object to a second object. The fitting is often used to forming a fluidic connection between the first object and the second object.

Foot Valve: As used in this disclosure, a foot valve is a fluid intake port that is located at or near the bed of a body of water. The foot valve is typically used to feed water into a pump that is drawing water out of the body of water.

Framework: As used in this disclosure, a framework refers to a second object or structure that encloses a first object or structure.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Inner Dimension: As used in this disclosure, the term inner dimension describes the span from a first inside or interior surface of a container to a second inside or interior surface of a container. The term is used in much the same way that a plumber would refer to the inner diameter of a pipe.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Openwork: As used in this disclosure, the term open work is used to describe a structure, often a surface, which is formed with one or more openings that allow for visibility and fluid flow through the structure. Wrought work and meshes are forms of openwork.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Perimeter: As used in this disclosure, a perimeter is one or more curved or straight lines that bounds an enclosed area on a plane or surface. The perimeter of a circle is commonly referred to as a circumference.

Pipe: As used in this disclosure, a pipe is a hollow prism-shaped device that is suitable for use in transporting a fluid. The line that connects the center of the first base of the prism to the center of the second base of the prism is referred to as the axis of the prism or the centerline of the pipe. When two pipes share the same centerline they are said to be aligned. In this disclosure, the terms inner dimension of a pipe and outer dimension are used as they would be used by those skilled in the plumbing arts.

Polyvinylchloride: As used in this disclosure, polyvinylchloride (CAS 9006-86-2) refers to a polymer formed from vinyl chloride (CAS 75-01-4). The structure of vinyl chloride is $CH_2=CClH$. The common abbreviation for polyvinylchloride is PVC.

Body of water: As used in this disclosure, a body of water is a self-contained source of water. By self-contained is meant that that fluidic connections between the body of water and the other bodies of water do not result in a significant change or difference in the water volume contained in the body of water over a 24 hour period. A body of water can be naturally formed or a manmade structure.

Port: As used in this disclosure, a port is an opening formed in a first object that allows a second object to pass through a boundary formed by the first object.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a space formed by a boundary structure. The boundary structure forms a barrier that protects objects within the protected space from potential dangers from the other side of the boundary.

Rectangular Block: As used in this disclosure, a rectangular block refers to a three-dimensional prism structure comprising six rectangular surfaces (commonly called faces) formed at right angles. Within this disclosure, a rectangular block may further comprise rounded edges and corners.

Rigid Structure: As used in this disclosure, a rigid structure is a solid structure formed from an inelastic material that resists changes in shape. A rigid structure will permanently deform as it fails under a force. See bimodal flexible structure.

Tee Connector: As used in this disclosure, a T Connector is a three aperture fitting that is designed to connect a first pipe, a second pipe and a third pipe such that: 1) the center axis of the first pipe is aligned with the center axis of the second pipe; 2) the center axis of the third pipe is perpendicular to the aligned center axes of the first pipe and the second pipe; and, 3) the center axes of the first pipe, the second pipe, and the third pipe intersect at a single point. The tee connector is a commercially available plumbing and PVC pipe fitting.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A cubical support for a foot valve comprising
a plurality of pipes, a plurality of tee connectors, a plurality of 90-degree elbow tees, and an adhesive;
wherein the plurality of tee connectors and the plurality of 90-degree elbow tees assemble the plurality of pipes into the framework structure;
wherein the adhesive secures each congruent end of each pipe selected from the plurality of pipes to a fitting selected from the group consisting of: a) a port of a tee connector selected from the plurality of tee connectors; and, b) a port of a 90-degree elbow tee selected from the plurality of 90-degree elbow tees;
wherein the plurality of pipes comprises a plurality of full length pipes, a plurality of intermediate length pipes, a plurality of short length pipes, and a plurality of connecting pipes;
wherein each of the plurality of full length pipes is a pipe;
wherein each of the plurality of full length pipes is a rigid prism structure;
wherein the plurality of full length pipes are geometrically identical;
each of the plurality of intermediate length pipes is a pipe;
wherein each of the plurality of intermediate length pipes is a rigid prism structure;
wherein the plurality of intermediate length pipes are geometrically identical;
wherein the congruent ends of each of the plurality of intermediate length pipes are geometrically identical to the congruent ends of any of the plurality of full length pipes;
wherein each of the plurality of short length pipes is a pipe;
wherein each of the plurality of short length pipes is a rigid prism structure;
wherein the plurality of short length pipes are geometrically identical;
wherein the congruent ends of each of the plurality of short length pipes are geometrically identical to the congruent ends of any of the plurality of intermediate length pipes;
wherein each of the plurality of connecting pipes is a pipe;
wherein each of the plurality of connecting pipes is a rigid prism structure;
wherein the plurality of connecting pipes are geometrically identical;
wherein the congruent ends of each of the plurality of connecting pipes are geometrically identical to the congruent ends of any of the plurality of short length pipes;
wherein the plurality of full length pipes comprises a first full length pipe, a second full length pipe, a third full length pipe, a fourth full length pipe, a fifth full length pipe, and a sixth full length pipe;
wherein the plurality of intermediate length pipes comprises a first intermediate length pipe, a second intermediate length pipe, a third intermediate length pipe, a fourth intermediate length pipe, a fifth intermediate length pipe, a sixth intermediate length pipe, a seventh intermediate length pipe, an eighth intermediate length pipe, a ninth intermediate length pipe, a tenth intermediate length pipe, an eleventh intermediate length pipe, a twelfth intermediate length pipe, a thirteenth intermediate length pipe, a fourteenth intermediate length pipe, a fifteenth intermediate length pipe, and a sixteenth intermediate length pipe;
wherein the plurality of short length pipes comprises a first short length pipe, a second short length pipe, a third short length pipe, and a fourth short length pipe;
wherein the plurality of connecting pipes comprises a first connecting pipe and a second connecting pipe;
wherein the plurality of tee connectors comprises a first tee connector, a second tee connector, a third tee connector, a fourth tee connector, a fifth tee connector, a sixth tee connector, a seventh tee connector, an eighth tee connector, a ninth tee connector, a tenth tee connector, an eleventh tee connector, and a twelfth tee connector;
wherein the first tee connector interconnects the first intermediate length pipe and the second intermediate length pipe;
wherein the second tee connector interconnects the third intermediate length pipe and the fourth intermediate length pipe;
wherein the third tee connector interconnects the third full length pipe, the first short length pipe, and the first connecting pipe;
wherein the fourth tee connector interconnects the fourth full length pipe, the second short length pipe, and the first connecting pipe;
wherein the fifth tee connector interconnects the third full length pipe, the third short length pipe, and the second connecting pipe;
wherein the sixth tee connector interconnects the fourth full length pipe, the fourth short length pipe, and the second connecting pipe;
wherein the seventh tee connector interconnects the fifth intermediate length pipe and the sixth intermediate length pipe;
wherein the eighth tee connector interconnects the seventh intermediate length pipe and the eighth intermediate length pipe;
wherein the ninth tee connector interconnects the ninth intermediate length pipe, the tenth intermediate length pipe, and the first short length pipe;
wherein the tenth tee connector interconnects the eleventh intermediate length pipe, the second short length pipe, and the third short length pipe;
wherein the eleventh tee connector interconnects the thirteenth intermediate length pipe, the fourteenth intermediate length pipe, and the fourth short length pipe;
wherein the twelfth tee connector interconnects the fifteenth intermediate length pipe, the sixteenth intermediate length pipe, and the second short length pipe.

2. The cubical support for a foot valve according to claim 1
wherein the cubical support for a foot valve is configured for use with a foot valve;
wherein the cubical support for a foot valve is configured for use with a body of water;
wherein the cubical support for a foot valve is a framework structure;
wherein the cubical support for a foot valve is an openwork structure;
wherein the cubical support for a foot valve is submerged into the body of water such that the cubical support for a foot valve rests on the bed of the body of water;
wherein the cubical support for a foot valve elevates the foot valve above the bed of the body of water;

wherein the framework structure forms a protected space around the foot valve;

wherein the openwork structure allows for the free flow of water towards the foot valve.

3. The cubical support for a foot valve according to claim 2 wherein the plurality of tee connectors and the plurality of 90-degree elbow tees assemble the plurality of pipes into a rectangular block structure.

4. The cubical support for a foot valve according to claim 3 wherein the adhesive secures each attachment made between a pipe selected from the plurality of pipes and any structure selected from the group consisting of the plurality of tee connectors and the plurality of 90-degree elbow tees;

wherein the adhesive is a chemical substance that permanently secures each pipe selected from the plurality of pipes to two structures selected from the group consisting of the plurality of tee connectors and the plurality of 90-degree elbow tees.

5. The cubical support for a foot valve according to claim 4 wherein each of the plurality of pipes is a prism-shaped structure;

wherein each of the plurality of pipes is a rigid structure;

wherein each of the plurality of pipes is further defined with an outer diameter;

wherein the geometric shape of each of the plurality of pipes are geometrically identical.

6. The cubical support for a foot valve according to claim 5 wherein the span of the length of the center axis of the prism structure of plurality of pipes equals a length selected from a group consisting of a first length, a second length, a third length, and a fourth length;

wherein the span of the first length is greater than the span of the second length;

wherein the span of the second length is greater than the span of the third length;

wherein the span of the third length is greater than the span of the fourth length.

7. The cubical support for a foot valve according to claim 6 wherein each of the plurality of tee connectors is a tee connector;

wherein each of the plurality of tee connectors are identical;

wherein each tee connector selected from the plurality of tee connectors comprises three ports;

wherein the three ports of the selected tee connector are geometrically identical;

wherein the three ports of each of the plurality of tee connectors are geometrically similar to any pipe selected from the plurality of pipes.

8. The cubical support for a foot valve according to claim 7 wherein the span of the length of the inner diameter of any port of any tee connector selected from the plurality of tee connectors is greater than the span of the length of the outer diameter of any pipe selected from the plurality of pipes such that the selected pipe inserts into any port of the selected tee connector.

9. The cubical support for a foot valve according to claim 8 wherein each of the plurality of 90-degree elbow tees is a 90-degree elbow tee;

wherein each of the plurality of 90-degree elbow tees are identical;

wherein each 90-degree elbow tee selected from the plurality of 90-degree elbow tees comprises three ports;

wherein the three ports of the selected 90-degree elbow tee are geometrically identical;

wherein the three ports of each of the plurality of 90-degree elbow tees are geometrically similar to any pipe selected from the plurality of pipes.

10. The cubical support for a foot valve according to claim 9 wherein the span of the length of the inner diameter of any port of any 90-degree elbow tee selected from the plurality of 90-degree elbow tees is greater than the span of the length of the outer diameter of any pipe selected from the plurality of pipes such that the selected pipe inserts into any port of the selected 90-degree elbow tee.

11. The cubical support for a foot valve according to claim 10 wherein the lateral face of any pipe selected from the plurality of pipes is coated with the adhesive before the congruent end of the selected pipe inserts into a port of the tee connector selected to receive the selected pipe;

wherein the adhesive secures the selected pipe to the selected port of the selected tee connector;

wherein the lateral face of any pipe selected from the plurality of pipes is coated with the adhesive before the congruent end of the selected pipe inserts into a port of the 90-degree elbow tee selected to receive the selected pipe;

wherein the adhesive secures the selected pipe to the selected port of the selected 90-degree elbow tee.

12. The cubical support for a foot valve according to claim 11 wherein the span of the length of each of the plurality of full length pipes equals the first length;

wherein the span of the length of each of the plurality of intermediate length pipes equals the second length;

wherein the span of the length of each of the plurality of short length pipes equals the third length;

wherein the span of the length of each of the plurality of connecting pipes equals the fourth length.

13. The cubical support for a foot valve according to claim 12 wherein the plurality of 90-degree elbow tees comprises a first 90-degree elbow tee, a second 90-degree elbow tee, a third 90-degree elbow tee, a fourth 90-degree elbow tee, a fifth 90-degree elbow tee, a sixth 90-degree elbow tee, a seventh 90-degree elbow tee, and an eighth 90-degree elbow tee;

wherein the first 90-degree elbow tee interconnects the first full length pipe, the first intermediate length pipe, and the ninth intermediate length pipe;

wherein the second 90-degree elbow tee interconnects the first full length pipe, the third intermediate length pipe, and the eleventh intermediate length pipe;

wherein the third 90-degree elbow tee interconnects the second full length pipe, the fourth intermediate length pipe, and the thirteenth intermediate length pipe;

wherein the fourth 90-degree elbow tee interconnects the second full length pipe, the second intermediate length pipe, and the fifteenth intermediate length pipe;

wherein the fifth 90-degree elbow tee interconnects the fifth full length pipe, the fifth intermediate length pipe, and the tenth intermediate length pipe;

wherein the sixth 90-degree elbow tee interconnects the fifth full length pipe, the seventh intermediate length pipe, and the twelfth intermediate length pipe;

wherein the seventh 90-degree elbow tee interconnects the sixth full length pipe, the eighth intermediate length pipe, and the fourteenth intermediate length pipe;

wherein the eighth 90-degree elbow tee interconnects the sixth full length pipe, the sixth intermediate length pipe, and the sixteenth intermediate length pipe.

14. The cubical support for a foot valve according to claim 13 wherein the first full length pipe further comprises a first congruent end and a second congruent end;

wherein the second full length pipe further comprises a third congruent end and a fourth congruent end;

wherein the third full length pipe further comprises a fifth congruent end and a sixth congruent end;

wherein the fourth full length pipe further comprises a seventh congruent end and an eighth congruent end;

wherein the fifth full length pipe further comprises a ninth congruent end and a tenth congruent end;

wherein the sixth full length pipe further comprises an eleventh congruent end and a twelfth congruent end;

wherein the first intermediate length pipe further comprises a thirteenth congruent end and a fourteenth congruent end;

wherein the second intermediate length pipe further comprises a fifteenth congruent end and a sixteenth congruent end;

wherein the third intermediate length pipe further comprises a seventeenth congruent end and an eighteenth congruent end;

wherein the fourth intermediate length pipe further comprises a nineteenth congruent end and a twentieth congruent end;

wherein the fifth intermediate length pipe further comprises a twenty-first congruent end and a twenty-second congruent end;

wherein the sixth intermediate length pipe further comprises a twenty-third congruent end and a twenty-fourth congruent end;

wherein the seventh intermediate length pipe further comprises a twenty-fifth congruent end and a twenty-sixth congruent end;

wherein the eighth intermediate length pipe further comprises a twenty-seventh congruent end and a twenty-eighth congruent end;

wherein the ninth intermediate length pipe further comprises a twenty-ninth congruent end and a thirtieth congruent end;

wherein the tenth intermediate length pipe further comprises a thirty-first congruent end and a thirty-second congruent end;

wherein the eleventh intermediate length pipe further comprises a thirty-third congruent end and a thirty-fourth congruent end;

wherein the twelfth intermediate length pipe further comprises a thirty-fifth congruent end and a thirty-sixth congruent end;

wherein the thirteenth intermediate length pipe further comprises a thirty-seventh congruent end and a thirty-eighth congruent end;

wherein the fourteenth intermediate length pipe further comprises a thirty-ninth congruent end and a fortieth congruent end;

wherein the fifteenth intermediate length pipe further comprises a forty-first congruent end and a forty-second congruent end;

wherein the sixteenth intermediate length pipe further comprises a forty-third congruent end and a forty-fourth congruent end;

wherein the first short length pipe further comprises a forty-fifth congruent end and a forty-sixth congruent end;

wherein the second short length pipe further comprises a forty-seventh congruent end and a forty-eighth congruent end;

wherein the third short length pipe further comprises a forty-ninth congruent end and a fiftieth congruent end;

wherein the fourth short length pipe further comprises a fifty-first congruent end and a fifty-second congruent end;

wherein the first connecting pipe further comprises a fifty-third congruent end and a fifty-fourth congruent end;

wherein the second connecting pipe further comprises a fifty-fifth congruent end and a fifty-sixth congruent end;

wherein the first tee connector further comprises a first port, a second port, and a third port;

wherein the second tee connector further comprises a fourth port, a fifth port, and a sixth port;

wherein the third tee connector further comprises a seventh port, an eighth port, and a ninth port;

wherein the fourth tee connector further comprises a tenth port, an eleventh port, and a twelfth port;

wherein the fifth tee connector further comprises a thirteenth port, a fourteenth port, and a fifteenth port;

wherein the sixth tee connector further comprises a sixteenth port, a seventeenth port, and an eighteenth port;

wherein the seventh tee connector further comprises a nineteenth port, a twentieth port, and a twenty-first port;

wherein the eighth tee connector further comprises a twenty-second port, a twenty-third port, and a twenty-fourth port;

wherein the ninth tee connector further comprises a twenty-fifth port, a twenty-sixth port, and a twenty-seventh port;

wherein the tenth tee connector further comprises a twenty-eighth port, a twenty-ninth port, and a thirtieth port;

wherein the eleventh tee connector further comprises a thirty-first port, a thirty-second port, and a thirty-third port;

wherein the twelfth tee connector further comprises a thirty-fourth port, a thirty-fifth port, and a thirty-sixth port;

wherein the first 90-degree elbow tee further comprises a thirty-seventh port, a thirty-eighth port, and a thirty-ninth port;

wherein the second 90-degree elbow tee further comprises a fortieth port, a forty-first port, and a forty-second port;

wherein the third 90-degree elbow tee further comprises a forty-third port, a forty-fourth port, and a forty-fifth port;

wherein the fourth 90-degree elbow tee further comprises a forty-sixth port, a forty-seventh port, and a forty-eighth port;

wherein the fifth 90-degree elbow tee further comprises a forty-ninth port, a fiftieth port, and a fifty-first port;

wherein the sixth 90-degree elbow tee further comprises a fifty-second port, a fifty-third port, and a fifty-fourth port;

wherein the seventh 90-degree elbow tee further comprises a fifty-fifth port, a fifty-sixth port, and a fifty-seventh port;
wherein the eighth 90-degree elbow tee further comprises a fifty-eighth port, a fifty-ninth port, and a sixtieth port;
wherein the first congruent end of the first full length pipe inserts into the thirty-seventh port of the first 90-degree elbow tee;
wherein the second congruent end of the first full length pipe inserts into the fortieth port of the second 90-degree elbow tee;
wherein the third congruent end of the second full length pipe inserts into the forty-sixth port of the fourth 90-degree elbow tee;
wherein the fourth congruent end of the second full length pipe inserts into the forty-third port of the third 90-degree elbow tee;
wherein the fifth congruent end of the third full length pipe inserts into the ninth port of the third tee connector;
wherein the sixth congruent end of the third full length pipe inserts into the fifteenth port of the fifth tee connector;
wherein the seventh congruent end of the fourth full length pipe inserts into the twelfth port of the fourth tee connector;
wherein the eighth congruent end of the fourth full length pipe inserts into the eighteenth port of the sixth tee connector;
wherein the ninth congruent end of the fifth full length pipe inserts into the forty-ninth port of the fifth 90-degree elbow tee;
wherein the tenth congruent end of the fifth full length pipe inserts into the fifty-second port of the sixth 90-degree elbow tee;
wherein the eleventh congruent end of the sixth full length pipe inserts into the fifty-eighth port of the eighth 90-degree elbow tee;
wherein the twelfth congruent end of the sixth full length pipe inserts into the fifty-fifth port of the seventh 90-degree elbow tee.

15. The cubical support for a foot valve according to claim 14
wherein the thirteenth congruent end of the first intermediate length pipe inserts into the thirty-eighth port of the first 90-degree elbow tee;
wherein the fourteenth congruent end of the first intermediate length pipe inserts into the first port of the first tee connector;
wherein the fifteenth congruent end of the second intermediate length pipe inserts into the second port of the first tee connector;
wherein the sixteenth congruent end of the second intermediate length pipe inserts into the forty-seventh port of the fourth 90-degree elbow tee;
wherein the seventeenth congruent end of the third intermediate length pipe inserts into the forty-first port of the second 90-degree elbow tee;
wherein the eighteenth congruent end of the third intermediate length pipe inserts into the fourth port of the second tee connector;
wherein the nineteenth congruent end of the fourth intermediate length pipe inserts into the fifth port of the second tee connector;
wherein the twentieth congruent end of the fourth intermediate length pipe inserts into the forty-fourth port of the third 90-degree elbow tee;
wherein the twenty-first congruent end of the fifth intermediate length pipe inserts into the fiftieth port of the fifth 90-degree elbow tee;
wherein the twenty-second congruent end of the fifth intermediate length pipe inserts into the nineteenth port of the seventh tee connector;
wherein the twenty-third congruent end of the sixth intermediate length pipe inserts into the twentieth port of the seventh tee connector;
wherein the twenty-fourth congruent end of the sixth intermediate length pipe inserts into the fifty-ninth port of the eighth 90-degree elbow tee;
wherein the twenty-fifth congruent end of the seventh intermediate length pipe inserts into the fifty-third port of the sixth 90-degree elbow tee;
wherein the twenty-sixth congruent end of the seventh intermediate length pipe inserts into the twenty-second port of the eighth tee connector;
wherein the twenty-seventh congruent end of the eighth intermediate length pipe inserts into the twenty-third port of the eighth tee connector;
wherein the twenty-eighth congruent end of the eighth intermediate length pipe inserts into the fifty-sixth port of the seventh 90-degree elbow tee;
wherein the twenty-ninth congruent end of the ninth intermediate length pipe inserts into the third port of the first 90-degree elbow tee;
wherein the thirtieth congruent end of the ninth intermediate length pipe inserts into the twenty-fifth port of the ninth tee connector;
wherein the thirty-first congruent end of the tenth intermediate length pipe inserts into the twenty-sixth port of the ninth tee connector;
wherein the thirty-second congruent end of the tenth intermediate length pipe inserts into the fifty-first port of the fifth 90-degree elbow tee;
wherein the thirty-third congruent end of the eleventh intermediate length pipe inserts into the forty-second port of the second 90-degree elbow tee;
wherein the thirty-fourth congruent end of the eleventh intermediate length pipe inserts into the twenty-eighth port of the tenth tee connector;
wherein the thirty-fifth congruent end of the twelfth intermediate length pipe inserts into the twenty-ninth port of the tenth tee connector;
wherein the thirty-sixth congruent end of the twelfth intermediate length pipe inserts into the fifty-fourth port of the sixth 90-degree elbow tee;
wherein the thirty-seventh congruent end of the thirteenth intermediate length pipe inserts into the forty-fifth port of the third 90-degree elbow tee;
wherein the thirty-eighth congruent end of the thirteenth intermediate length pipe inserts into the thirty-first port of the eleventh tee connector;
wherein the thirty-ninth congruent end of the fourteenth intermediate length pipe inserts into the thirty-second port of the eleventh tee connector;
wherein the fortieth congruent end of the fourteenth intermediate length pipe inserts into the forty-seventh port of the seventh 90-degree elbow tee;
wherein the forty-first congruent end of the fifteenth intermediate length pipe inserts into the forty-eighth port of the fourth 90-degree elbow tee;
wherein the forty-second congruent end of the fifteenth intermediate length pipe inserts into the thirty-fourth port of the twelfth tee connector;

wherein the forty-third congruent end of the sixteenth intermediate length pipe inserts into the thirty-fifth port of the twelfth tee connector.

16. The cubical support for a foot valve according to claim 15 wherein the forty-fourth congruent end of the sixteenth intermediate length pipe inserts into the sixtieth port of the eighth 90-degree elbow tee;

wherein the forty-fifth congruent end of the first short length pipe inserts into the twenty-seventh port of the ninth tee connector;

wherein the forty-sixth congruent end of the first short length pipe inserts into the seventh port of the third tee connector;

wherein the forty-seventh congruent end of the second short length pipe inserts into the tenth port of the fourth tee connector;

wherein the forty-eighth congruent end of the second short length pipe inserts into the thirty-sixth port of the twelfth tee connector;

wherein the forty-ninth congruent end of the third short length pipe inserts into the thirtieth port of the tenth tee connector;

wherein the fiftieth congruent end of the third short length pipe inserts into the thirteenth port of the fifth tee connector;

wherein the fifty-first congruent end of the fourth short length pipe inserts into the sixteenth port of the sixth tee connector;

wherein the fifty-second congruent end of the fourth short length pipe inserts into the thirty-third port of the eleventh tee connector.

17. The cubical support for a foot valve according to claim 16 wherein the fifty-third congruent end of the first connecting pipe inserts into the eighth port of the third tee connector;

wherein the fifty-fourth congruent end of the first connecting pipe inserts into the eleventh port of the fourth tee connector;

wherein the fifty-fifth congruent end of the second connecting pipe inserts into the fifteenth port of the fifth tee connector;

wherein the fifty-sixth congruent end of the second connecting pipe inserts into the seventeenth port of the sixth tee connector.

* * * * *